United States Patent [19]

Kröckert et al.

[11] Patent Number: 5,076,848

[45] Date of Patent: Dec. 31, 1991

[54] PROCESS FOR THE PREPARATION OF IRON YELLOW PIGMENTS

[75] Inventors: Bernd Kröckert, Wesel; Helmut Printzen; Gunter Buxbaum, both of Krefeld, all of Fed. Rep. of Germany

[73] Assignee: Bayer Aktiengesellschaft, Leverkusen, Fed. Rep. of Germany

[21] Appl. No.: 484,528

[22] Filed: Feb. 26, 1990

[30] Foreign Application Priority Data

Mar. 11, 1989 [DE] Fed. Rep. of Germany ....... 3907910

[51] Int. Cl.$^5$ .......................... C09C 1/22; C01G 49/02
[52] U.S. Cl. .................................. 106/456; 423/633; 423/634
[58] Field of Search ...................... 106/456, 419, 431; 423/632, 633, 634; 75/365

[56] References Cited

U.S. PATENT DOCUMENTS

| | | |
|---|---|---|
| 1,327,061 | 6/1920 | Penniman . |
| 1,368,748 | 2/1921 | Penniman ............................ 423/633 |
| 2,111,726 | 7/1932 | Plews ................................... 423/633 |
| 3,843,773 | 10/1974 | Pingaud . |
| 4,060,596 | 11/1977 | Nakamura ........................... 423/633 |
| 4,112,063 | 9/1978 | Buxbaum ............................ 423/633 |
| 4,221,766 | 9/1980 | Pabst . |
| 4,620,879 | 11/1976 | Burow et al. ....................... 106/456 |
| 4,698,100 | 10/1987 | Burow et al. ....................... 106/456 |
| 4,806,335 | 2/1989 | Saito et al. .......................... 423/632 |

FOREIGN PATENT DOCUMENTS 0030790  6/1981  European Pat. Off. ............ 106/456

OTHER PUBLICATIONS

Chemical Abstracts, Dec. 1986, p. 133, Columbus OH.

*Primary Examiner*—William R. Dixon, Jr.
*Assistant Examiner*—Paul Marcantoni
*Attorney, Agent, or Firm*—Connolly & Hutz

[57] ABSTRACT

An improved process is disclosed for preparing iron yellow pigments from iron—(II) salt solutions, in the presence of iron scrap, by injection of air at elevated temperatures. After formation of the pigment, the reaction suspension is stirred without additional gas injection, whereby lighter, purer yellow pigments are obtained.

10 Claims, No Drawings

PROCESS FOR THE PREPARATION OF IRON YELLOW PIGMENTS

The present invention relates to a process for the preparation of iron yellow pigments by the Penniman process in which goethite is produced from iron-(II) salt solutions in the presence of iron scrap by the injection of air at an elevated temperature.

Iron yellow pigments may be produced by the precipitation process, the Penniman process or the aniline process (Winnacker-Küchler. Chemische Technologie, 4th Edition, 1983, Volume 3, Anorg. Technologie II. pages 376–380).

In the process of Penniman and Zoph (U.S. Pat. No. A 1,327,061 and U.S. Pat. No. A1,368,748), metallic iron in the form of scrap, an iron-II salt and $\alpha$-FeOOH as nucleus are suspended. The Fe-II ions are oxidized by gassing with air or oxygen. When the resulting Fe-III ions are hydrolysed during synthesis of the pigment, protons are produced which dissolve the iron put into the process and form Fe-II ions. This means that the iron introduced into the process is converted into iron oxide pigment and that in the ideal case Fe-II ions only function catalytically.

For ecological reasons, this process is always to be preferred to the precipitation process since precipitation with bases gives rise to the formation of salts in an equimolar quantity to the pigment so that the considerable amount of salt formed constitutes an ecological problem.

Various types of reactors and methods of gassing are available for gassing and stirring the pigment suspension in the Penniman process (U.S. Pat. Nos. A 2,111,726, DD-A 208,599 and U.S. Pat. No. A 1,327,061). The disadvantage of all these types of reactors and gassing systems when used on a large industrial scale, however, is that the metallic iron is necessarily put into the reactor in the form of a heap or in the form of packets. Due to the heaping up of metal in a large scale industrial process, magnetite is found to be formed in parts of the scrap which fail to be sufficiently mixed. It has therefore not hitherto been possible to obtain yellow pigments of a pure colour since even small quantities of the black magnetite impairs the colours of the yellow goethite to be produced. Perfect mixing of the components in the reaction suspension is technically hardly feasible.

It is therefore an object of this invention to provide a process which is free from the disadvantages described above.

It was surprisingly found that this may be achieved quite simply if after synthesis of the pigment, the suspension is thoroughly mixed at about the same temperature with stirring but without further gassing. If the colour of the pigments is compared before and after this procedure, it is found that the pigment obtained after this mixing without further gassing is considerably lighter and more saturated in colour. The effect is also very marked when the completed suspension is separated from the residual metal into another container. Stirring of the hot suspension without gassing in this case again results in much purer yellow pigments.

This invention thus relates to a process for the preparation of iron yellow pigments by the Penniman process in which goethite is produced from iron-(II) salt solutions in the presence of iron scrap by the injection of air at an elevated temperature, the reaction suspension being stirred at the reaction temperature for 0.5 to 20 hours, preferably 1 to 10 hours, without further gassing after formation of the pigment has been completed.

A preferred variation of the process consists in that the carbon content of the scrap put into the process is less than 1%, preferably less than 0.5%, calculated as carbon. Higher carbon contents result in dirty yellow pigments. The iron-II salt used is normally $FeSO_4$ or $FeCl_2$.

After production of the pigment has been completed, the iron sulphate which acts as catalyst is precipitated with bases (U.S. Pat. No. A 4,221,766). The quantity of salt produced is thus determined by the quantity of iron sulphate put into the process and may advantageously be varied from 5 g/l to 100 g/l of $FeSO_4$, most preferably from 10 g/l to 50 g/l of $FeSO_4$. The same applies to $FeCl_{2ll}$.

A preferred embodiment of the process according to the invention is characterised in that needle-shaped $\alpha$-FeOOH nuclei are introduced at the beginning at a concentration of from 0.5 to 30 g/l of FeOOH, preferably from 1 to 20 g/l of FeOOH.

Non-silking iron yellow pigments, the preparation of which is described in DE-A 3 326 632 and DE-A 3 716 300, may also be used as nuclei. Another preferred embodiment of the process according to the invention thus consists in that non-silking $\alpha$-FeOOH is introduced into the process at the beginning at a concentration of from 10 to 100 g/l of FeOOH, preferably from 20 to 80 g/l of FeOOH.

The invention thus provides an improvement to the Penniman process in that it enables black magnetite, which is obtained as a mixture in the large scale industrial production of goethite by the Penniman process, to be removed from the yellow pigment so that yellow pigments of a pure colour can be obtained.

In the examples which follow, determination of the Fe-II and Fe-III contents was carried out by the conventional wet chemical methods.

The carbon was determined quantitatively as $CO_2$ in an infra-red cell.

The colour shades of all the samples were determined at a pigment volume concentration of 10% in Alkydal ® F 48, Trade Product of Bayer AG. a medium oily alkyd resin, according to DIN 6174 (equivalent ISO DIN 7724, 1–3 drafts). The colorimetrically determined values are delta values and always show the difference between the unstirred sample and the subsequently restirred sample. Positive values for $\Delta L^*$, brightness and $\Delta C^*$, saturation indicate a coloristic improvement of the pigment.

The invention is described below with the aid of examples but is not limited thereto.

EXAMPLE 1

Iron yellow pigments were produced by the Penniman process. The pigment was prepared in a 1000 m$^3$ vat into which 100 t of iron scrap (C=0.12%) and 700 m$^3$ of suspension had been introduced. The suspension initially contained 45 g/l of $FeSO_4$ and 5 g/l of goethite as nucleus which had been prepared by the precipitation process from an iron sulphate solution with sodium hydroxide solution and gassing with air (U.S. Pat. No. A 2,939,767, Example 4). The pigment was sufficiently built up after the components had been gassed for 80 hours with 600 m$^3$/h of air at 85° C. Mixing of the suspension was then continued for a further 6 hours without gassing. A coloristic comparison of the pigments obtained before this after-stirring and after 3 hours and after 6 hours shows the constant improvement in brightness ΔL* and saturation ΔC*.

| Sample | g/l of FeSO₄ solution | % of FeO in the pigment | ΔL* | Δa* | Δb* | ΔC* |
|---|---|---|---|---|---|---|
| without stirring | 40 | 0.37 | 0 | 0 | 0 | 0 |
| after 3 h | 42 | 0.04 | 0.7 | 0.1 | 0.8 | 0.8 |
| after 6 h | 45 | 0.02 | 1.2 | 0.7 | 1.8 | 1.9 |

EXAMPLE 2

70 m³ of suspension consisting of 45 g/l of FeSO₄ and 70 g/l of spherulitic FeOOH were introduced into a 100 m³ reactor containing 10 t of iron scrap (C=0.12%) The spherulitic FeOOH had been prepared according to DE-A 3 716 300, Example 4. 62.0 m³ of commercial FeSO₄ solution (c=201.0 g of FeSO₄/l) and 2215 l of commercial Al₂(SO₄)₃ solution (c=1.00 mol/l) were heated to 30° C. with stirring. After the mixture had been heated, 9.4 m³ of commercial sodium hydroxide solution (c=9.5 mol/l) were pumped in and oxidation was carried out with 700 m³ of air/h with stirring while the temperature was raised to 45° C. until the pH was ≦3.8. 80.0 m³ of water were added to 36.0 m³ of this yellow nuclear suspension which was then heated to 75° C. After this heating, the pH fell to ≦3.0. 26.0 m³ Of commercial sodium hydroxide solution (c=5.00 mol/l) and 37.0 m³ of commercial FeSO₄ solution (c=201.0 g of FeSO₄/l) were then added in the course of about 16 hours at 75° C. with stirring and gassing with 700 m³ of air/h so that the pH of the suspension rose by 0.1 to 0.2 units per hour until it reached a value of 3.8, after which it remained constant at 4.0±0.2. For this experiment, the yellow nuclear suspension was only multiplied by a factor of 5.2 and then put into the Penniman process.

Pigment was built up in the Pennimann suspension over a period of 24 hours at 85° C. and with a supply of 700 m³ of air/h. The suspension was then stirred for 16 hours without gassing. Samples after 8 and 16 hours showed the coloristic improvement of the pigments.

| Sample | g/l of FeSO₄ solution | % of FeO in the pigment | ΔL* | Δa* | Δb* | ΔC* |
|---|---|---|---|---|---|---|
| without stirring | 37 | 0.26 | 0 | 0 | 0 | 0 |
| after 8 h | 42 | 0.04 | 0.3 | 0.3 | 0.5 | 0.6 |
| after 16 h | 48 | 0.03 | 0.7 | −0.1 | 0.7 | 0.7 |

EXAMPLE 3

250 m³ of a pigment suspension prepared as in Example 1 were pumped into a vat not containing iron scrap. The suspension was stirred for 6 hours while still hot and without further supply of gas. The coloristic improvement of the pigment is evident from the colour values.

| Sample | g/l of FeSO₄ solution | % of FeO in the pigment | ΔL* | Δa* | Δb* | ΔC* |
|---|---|---|---|---|---|---|
| without stirring | 39 | 0.13 | 0 | 0 | 0 | 0 |
| after 3 h | 41 | 0.03 | 0.1 | 0.2 | 0.4 | 0.4 |
| after 6 h | 42 | 0.01 | 0.6 | 0.2 | 0.7 | 0.7 |

What is claimed is:

1. In a process for the preparation of iron yellow pigments by the Penniman process in which goethite is produced from iron-(II) salt solutions in the presence of iron scrap by the injection of air at an elevated temperature of about 85° C., the improvement comprising stirring the reaction suspension after the formation of the pigment and without injection of gas at substantially the reaction temperature for 0.5 to 20 hours.

2. The process of claim 1 wherein the reaction suspension is stirred for 1 to 10 hours.

3. The process of claim 1, wherein the carbon content of the scrap used is less than 1% calculated as elemental carbon.

4. The process of claim 3, wherein the carbon content of the scrap used is less than 0.5%.

5. The process of claim 1 wherein the quantity of Fe(II) in the suspension is between 5 g/l and 100 g/l of Fe(II) calculated as FeSO₄.

6. The process of claim 5, wherein the quantity of Fe(II) in the suspension is between 10 g/l and 50 g/l.

7. The process of claim 1 further comprising introducing needleshaped α-FeOOH nuclei to the process reaction at the onset of the process at a concentration between 0.5 to 30 g/l of α-FeOOH.

8. The process of claim 7, wherein the concentration of α-FeOOH nuclei introduced is between 1 and 20 g/l.

9. The process of claim 1 wherein non-silking α-FeOOH is introduced to the process reaction at the onset of the process at a concentration of between 10 and 100 g/l of FeOOH.

10. The process of claim 9, wherein the concentration of α-FeOOH introduced is between 20 and 80 g/l.

* * * * *